US008051158B2

(12) United States Patent
Kojima

(10) Patent No.: US 8,051,158 B2
(45) Date of Patent: Nov. 1, 2011

(54) PROGRAM MANAGEMENT APPARATUS AND METHOD

(75) Inventor: Nobuyuki Kojima, Yokohama (JP)

(73) Assignee: Canon Kabushiki Kaisha (JP)

( * ) Notice: Subject to any disclaimer, the term of this patent is extended or adjusted under 35 U.S.C. 154(b) by 460 days.

(21) Appl. No.: 12/055,611

(22) Filed: Mar. 26, 2008

(65) Prior Publication Data

US 2008/0244057 A1 Oct. 2, 2008

(30) Foreign Application Priority Data

Mar. 26, 2007 (JP) ................................. 2007-080189

(51) Int. Cl.
*G06F 15/16* (2006.01)
(52) U.S. Cl. ......................... 709/223; 709/203; 709/220
(58) Field of Classification Search .................. 709/203, 709/220, 223
See application file for complete search history.

(56) References Cited

U.S. PATENT DOCUMENTS

| 5,790,664 A * | 8/1998 | Coley et al. ................... 709/203 |
| 5,905,860 A * | 5/1999 | Olsen et al. ..................... 726/27 |
| 7,139,737 B2 * | 11/2006 | Takahashi et al. .............. 705/59 |
| 2003/0072448 A1 | 4/2003 | Nakamura et al. |
| 2003/0217171 A1 * | 11/2003 | Von Stuermer et al. ....... 709/231 |
| 2004/0267590 A1 * | 12/2004 | Clark et al. ........................ 705/9 |
| 2005/0027846 A1 * | 2/2005 | Wolfe et al. ................... 709/223 |
| 2007/0033655 A1 * | 2/2007 | Dawson .......................... 726/27 |
| 2007/0143398 A1 * | 6/2007 | Graham ........................ 709/204 |

FOREIGN PATENT DOCUMENTS

| JP | 2003-122537 A | 4/2003 |
| JP | 2004-126996 A | 4/2004 |
| JP | 2005-208935 A | 8/2005 |

* cited by examiner

*Primary Examiner* — Phuoc Nguyen
(74) *Attorney, Agent, or Firm* — Rossi, Kimms & McDowell LLP

(57) ABSTRACT

A management server 201 transmits information representing a list of additional applications installable on an image forming apparatus 202 to the image forming apparatus 202 (S410). When an application is selected from the list and an instruction to execute the application is issued, a request for installation is issued to the management server 201 if the application has not been installed. The management server 201 installs the requested application on the image forming apparatus if the management server 201 has a license for the requested application and the application can be installed (M470). On the other hand, if the application cannot be installed because of insufficient resources, a resource is freed up by flushing and then the application is installed.

5 Claims, 12 Drawing Sheets

FIG. 5

| DESCRIPTION | EXAMPLE | |
|---|---|---|
| MODEL NAME OF APPARATUS | iRC-3220 | ~5011 |
| UNIQUE NUMBER OF APPARATUS | XYZ003-1234-PQRS-5678 | ~5012 |
| VERSION OF APPARATUS | 10.23 | ~5013 |
| VERSION OF APPLICATION | 1.25 | ~5014 |
| MEMORY | 129KB | ~5015 |
| HDD | 32KB | ~5016 |
| RESOURCE #1 | 32 | ~5017 |
| RESOURCE #2 | 27 | ~5018 |

501

| DESCRIPTION | EXAMPLE | |
|---|---|---|
| TOTAL NUMBER OF APPLICATIONS | 9 | ~5021 |
| NAME OF APPLICATION #1 | AP1 | ~5022 |
| BRIEF DESCRIPTION OF APPLICATION #1 | FORM PRINTING | ~5023 |
| STATUS OF APPLICATION #1 | INSTALLABLE | ~5024 |
| ............ | | |
| NAME OF APPLICATION #n | AP9 | |
| BRIEF DESCRIPTION OF APPLICATION #n | SendToPdf | |
| STATUS OF APPLICATION #n | INSTALLED | |

502

PROGRAM MANAGEMENT APPARATUS AND METHOD

BACKGROUND OF THE INVENTION

1. Field of the Invention

The present invention relates to an image forming apparatus to which functions can be added and from which functions can be removed and, in particular, to a program management apparatus and method that manage applications for implementing additive functions and their licenses.

2. Description of the Related Art

Some sophisticated image forming apparatuses provide a platform for adding functions and allowing a new function to be added by installing an application program (hereinafter simply referred to as an application) running on the platform. The application is installed or executed after being licensed in order to prevent unauthorized use and illegal copying. Installation of an application on an image forming apparatus may be performed by a device management apparatus that is connected to a network and manages the image forming apparatus. In that case, an administrator installs the application on the image forming apparatus of interest through the device management apparatus, rather than installing the application in each image forming apparatus. Uninstallation of an application is performed in a similar manner. Management of licenses can be performed through the device management apparatus.

In either way, it is desirable that an unused application be uninstalled because resources available to an application on the image forming apparatus are typically limited. Therefore, methods have been proposed in which installation, use, and uninstallation of an application are performed as a process sequence in order to ensure resource management (see for example Japanese Patent Laid-Open No. 2005-208935).

On the other hand, there is a license management method called floating license management for applications for personal computers. In floating license management, a license server is provided and a client computer that uses an application is granted a license from the license server. The client communicates with the license server at all times while using the application. Once the communication is discontinued, the license is canceled and the client is prevented from using the application. The license server is able to put restrictions on the number of licenses that can be granted at a time and grant licenses to limited clients.

For floating license management, a license management system has been proposed in which a license for an application can be granted for each function of an operation function executing unit and a licensing agreement can be entered into according to the frequency of uses of the application (see for example Japanese Patent Laid-Open No. 2003-122537). Another license management system has been proposed in which if there is not a license that can be issued upon a license request from a client, another license is initialized to obtain a deliverable license (see for example Japanese Patent Laid-Open No. 2004-126996).

In these floating license management methods, a license is granted when the application is executed and the application can be installed without the license. Therefore, a license is dynamically granted by a server to a user who executes the application and license management can be automated.

However, in the floating license management, an application to be licensed remains installed on an apparatus (for example a computer) of interest while there is the possibility that the application will be licensed to the apparatus. Accordingly, the floating license management is not suitable for peripheral devices such as image forming apparatuses which have limited resources. Therefore, it is desirable that an application for adding a function to an image forming apparatus be installed each time an additive function is used and be uninstalled after the function is used, as described in Japanese Patent Laid-Open No. 2005-208935.

However, such an application management method (hereinafter referred to as an individual license management method) has the following problems.

(1) The user is unable to know of the presence of an application that has not been installed. In the floating license management method, an application that is not licensed is also installed on an apparatus, and therefore the user can know of the presence of the application (that is, the presence of an additive function) via the apparatus, although the user is not allowed to execute the application. In contrast, in the individual license management method, the apparatus does not allow the user to know of the presence of an application that has not been installed.

(2) License management by an administrator is troublesome. The number of applications that can be installed on an image forming apparatus is limited by resources. Accordingly, the administrator needs to install applications that are in high demand by users or to change a combination of installed applications upon request from a user. Furthermore, the administrator needs to optimize an application to be installed on an image forming apparatus when users are transferred or the office is relocated, for example. This is because an image forming apparatus is typically located at a place nearest the user who uses the image forming apparatus.

(3) Continuity of work using an additive function is lost. In the individual license management method, continuity of work can be lost due to uninstallation of an application because context (state, namely settings and data of the application) is lost. For example, in the case of the function of transmitting e-mail, when an address list is uninstalled along with the application, addresses on the list need to be re-input the next time the e-mail transmission function is used.

(4) The application management method described in Japanese Patent Laid-Open No. 2005-208935 is based on the premise that the apparatus has at least the resources required for initially installing and running the application. The method does not consider cases where resources are insufficient when installing an application and the application cannot be installed if resources are insufficient.

SUMMARY OF THE INVENTION

The present invention has been made in light of the examples of the related art described above and an object of the present invention is to solve the problems described above. In particular, the present invention includes a configuration described below.

According to the claimed invention, there is provided a program management apparatus connected to one or a plurality of image forming apparatuses and managing a program installable to the image forming apparatuses, comprising: a storage, configured to store program information including identification information of a program installable to the image forming apparatus and license information indicating a license for the program if the program requires the license; a program information transmitter, configured to transmit the program information stored in said storage to the image forming apparatus; and a program transmitter, configured to transmit the program to the image forming apparatus for installing the program on the image forming apparatus in response to a request for program execution from the image forming apparatus if there is a license for the program.

The present invention enables a user to know the presence of an application that has not been installed. Furthermore, the present invention simplifies license management by an administrator. The present invention also maintains continuity of work that uses an additive function. The present invention enables an application to be installed even when resources are insufficient when installing the application.

Further features of the present invention will become apparent from the following description of exemplary embodiments with reference to the attached drawings.

BRIEF DESCRIPTION OF THE DRAWINGS

FIG. 5 is a diagram showing data sent and received between the image forming apparatus 202 and a management server 201;

DESCRIPTION OF THE EMBODIMENTS

First Embodiment

A first embodiment implementing the present invention will be described with reference to FIGS. 1, 2, 3, 4, 5, 6, 11, and 12. FIG. 2 shows a configuration for implementing the first embodiment. An image forming apparatus 202 and a management server 201 are interconnected through a network (LAN) 200. A service 210 for communicating with the management server 201 is running on the image forming apparatus 202. An administrator registers applications additionally installable on the image forming apparatus 202 and their licenses on the management server 201 beforehand. That is, stored on the management server 201 are program information, including the names of applications and license information, including information concerning the licenses for the programs. For example, the management server 201 has a Web server function and the administrator uses a Web browser on a management terminal 203 to access the Web server on the management server 201 to upload an application and its license. Application programs installable on the image forming apparatus and their licenses are acquired by the management terminal 203 beforehand offline or by accessing a license server, not shown. A license indicates that execution of an application program on a specified number of (for example one) image forming apparatuses is permitted by the provider of the application program. For example, a license is indicated by license information representing specifics of the license. In the first embodiment, the image forming apparatus determines that an application program is licensed, based on license information indicating a license installed along with the application program. Alternatively, the determination as to whether the application is licensed can be made by using other method such as by checking for a license on a regular basis with the management server. A configuration of a multifunctional copying machine (MFP) will be described as an example of the image forming apparatus 202. Examples of image forming apparatuses also include computer peripheral devices having the function of forming images, such as monofunctional printers and regular copying machines. In the following description, license information will be also simply referred to as a license.

<Hardware Configuration of the Image Forming Apparatus>

Figure 12:
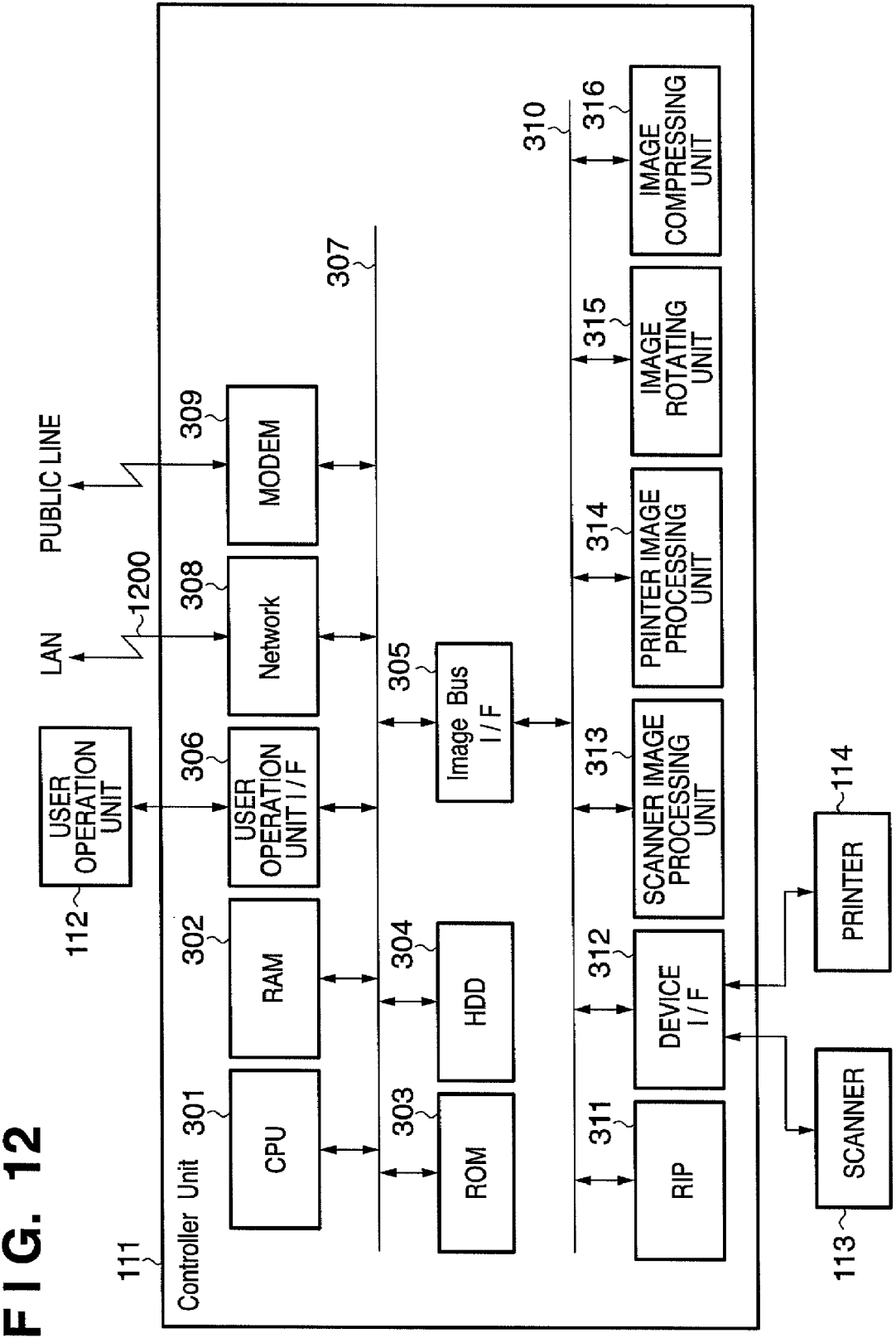
FIG. 12 is a diagram showing a hardware configuration of the image forming apparatus.

FIG. 12 is a block diagram showing a hardware configuration of the image forming apparatus 202. A controller unit 111 connects to a scanner 113, which is an image input device, and a printer 114, which is an image output device, and also connects to a LAN 100 or a public network (WAN) for inputting and outputting image information and device information. CPU 301 is a controller controlling the entire controller unit 111. RAM 302 is a system work memory used by the CPU 301 for operating. The RAM 302 also functions as an image memory for temporarily storing image data. ROM 303 stores a boot program for the system. HDD 304 is a hard disk drive storing system software and image data and the like. An application program installed is stored in a memory device such as a backed-up RAM or an erasable ROM in the present embodiment. An application program installed may be stored in a hard disk, of course.

A user operation unit interface (I/F) 306 provides an interface with a user operation unit (UI) 112 and outputs image data to be displayed on the user operation unit 112 to the user operation unit 112. The user operation unit interface 306 is also responsible for providing information input by a user through the user operation unit 112 to the CPU 301. Network interface (Network) 308 provides connection to a LAN 200 and inputs and outputs information onto and from the LAN 200. Modem (MODEM) 309 provides connection to a public line and outputs and inputs information onto and from the public line. These devices are provided on a system bus 307.

Image bus interface (I/F) 305 is a bus bridge that connects the system bus 307 with an image bus 310 that transfers image data at a high speed, and transforms a data structure. The image bus 310 is formed by a PCI bus or an IEEE1394. Provided on the image bus 310 are the following devices. Raster image processor (RIP) 311 translates a PDL code sent over a network into a bitmap image. Device interface (I/F) unit 312 connects the scanner 113 and the printer 114, which are image input/output devices, to the controller unit 111 and performs conversion between synchronous and asynchronous systems for image data. Scanner image processing unit 313 corrects, manipulates, and edits input image data. Printer image processing unit 314 performs processing such as correction and resolution conversion of a printout image data in accordance with the performance of the printer 114. Image rotating unit 315 rotates image data. Image compressing unit 316 compresses/decompresses multilevel image data using JPEG and compresses/decompresses binary image data using JBIG, MMR, or MH.

<Software Configuration of the Image Forming Apparatus>

Figure 11:
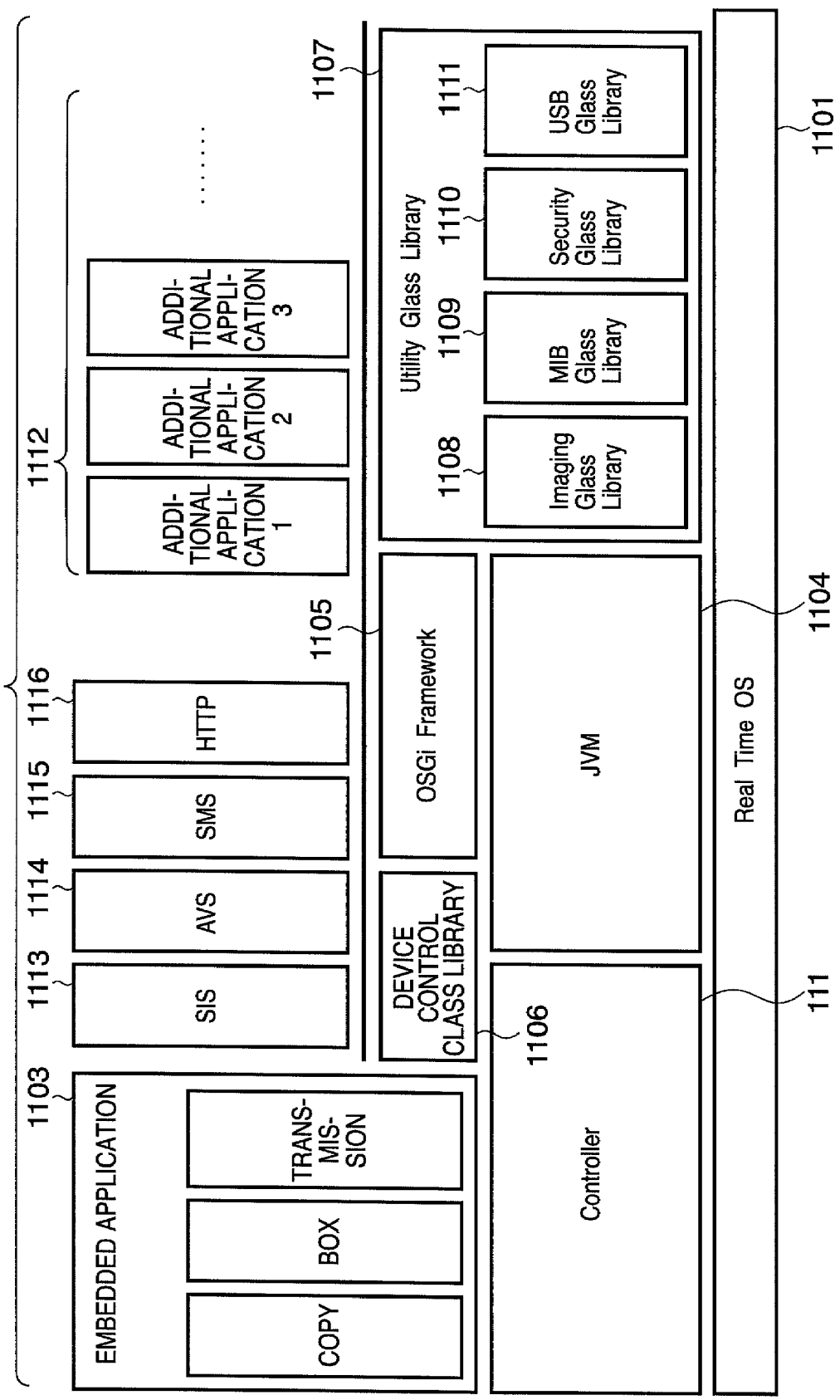
FIG. 11 is a diagram showing a software configuration of an image forming apparatus.

FIG. 11 shows a software configuration for management of addition and deletion of embedded application programs and executing the embedded application in the image forming apparatus. An application that runs on a platform provided by the image forming apparatus 202 and can be added and deleted will be referred to as an additional application.

A real time operating system (OS) 1101 is a realtime operating system that controls the entire image forming apparatus and provides services and a framework for management of various resources that are optimized for controlling embedded applications. The controller unit 111 controls hardware such as a reader unit and a printer unit of the image forming apparatus and also controls jobs that use printing, scanning, and image transformation. An embedded application 1103 is a program that is implemented primarily by using functions of the controller unit 111, implements functions such as copy, box, and transmission functions, and includes a user interface. JVM 1104 is a Java (registered trademark) virtual machine and includes an interpreter for enabling a Java (registered trademark) program to run on the image forming apparatus. The JVM 1104 provides a platform for additional applications.

An OSGi framework 1105 is a component that manages the lifecycle of an application that runs on the JVM 1104. The OSGi framework 1105 manages installation and uninstallation, and activation and deactivation of applications. The mechanism is designed to conform to a standard technology called "OSGi Framework", which is a standard technology for management services. The OSGi framework is detailed in "OSGi Service Platform Release 2, October 2001, OSGi". The OSGi framework 1105 corresponds to a service 210. Operations such as installation, uninstallation and execution of applications by the image forming apparatus in the present embodiment are implemented by the OSGi framework 1105.

A device control class library 1106 is a library providing an interface for an additional application to control devices such as the printer and the scanner of the image forming apparatus through the controller unit 111. A utility class library 1107 is a library providing various functions of the image forming apparatus to additional applications. An imaging class library 1108 is a library providing fundamental image processing functions and performs processing such as reduction of the size of an image and conversion of the format of an image.

An MIB agent class library 1109 is a library for obtaining and setting MIB (Management Information Base) information set on the image forming apparatus. A security class library 1110 is a library providing an interface corresponding to a Java (registered trademark) standard cryptographic security package (JCE and JSSE). A USB common class library 1111 is a library providing a communication function through USB.

An additional application 1112 is an application program written in Java (registered trademark) language and can be dynamically added and deleted to and from the image forming apparatus. Additional applications are classified into three types. A first type is an applet type that is an application displaying a user interface on the user operation unit 112. A second type is a servlet type that displays a user interface on a Web browser on a network. A third type is an esplet type that does not have a user interface. Installation of an additional application can expand the functions of the image forming apparatus.

A system interface service (SIS) 1113 is a service providing the function of exchanging information between an additional application and the image forming apparatus. The system interface service 113 is used for notifying an event such as a change of power supply status to an application in response to a request from the application and for an application to request a device to control an LED or a beeper or the like.

An applet viewer service (AVS) 1114 is a service that performs operations such as registration, display, and switching of applet-type services. The applet viewer service 1114 also notifies an event to an additional application of applet type.

An HTTP service 1116 is a component that provides communications using HTTP and HTTPS. The function of the HTTP service enables access to a system application and an additional application from a Web browser (i.e. an administrator terminal) on a network.

A service management service (SMS) 1115 is a service that provides a user interface for managing additional applications. The SMS 1115 has the following functions for managing applications.

Listing: Shows program information such as application names, installation dates, application IDs, application status, license status, and status of use of resources or a part of the program information by a list.

Installation: Installs an application.

Uninstallation: Completely removes an application from a device. An application the license for which has not been invalidated cannot be uninstalled.

Activation: Activates and starts an inactive application.

Deactivation: Deactivates a started (active) application.

Installation of a license: Installs a license file (i.e. license information) for an application that requires a license.

Invalidate a license: Invalidates a license for an application so that a license file can be taken out of a device to the management server.

Downloading of a license: Uploads an invalidated license (license file) to the management server. The uploaded license can be reinstalled on the same image forming apparatus. The uploaded license can be installed on another image forming apparatus on the network as well.

Switching between authentication applications: Switches from one authentication application to another. Reboot of the device is required after switching.

Display reordering: Changes the order in which applications are displayed on the user operation unit.

System information display: Displays system information.

Application information listing: Shows information including specifics of the licenses of applications by a list.

Application history listing: Displays a list of uninstalled applications.

Password changing: Changes a password for logging in SMS.

The image forming apparatus according to the present invention has the software configuration described above. While Java (registered trademark) is used as the platform herein, the platform may be another language processing system. The platform for an additional application is desirably one such that the application is independent of hardware.

Figure 3:
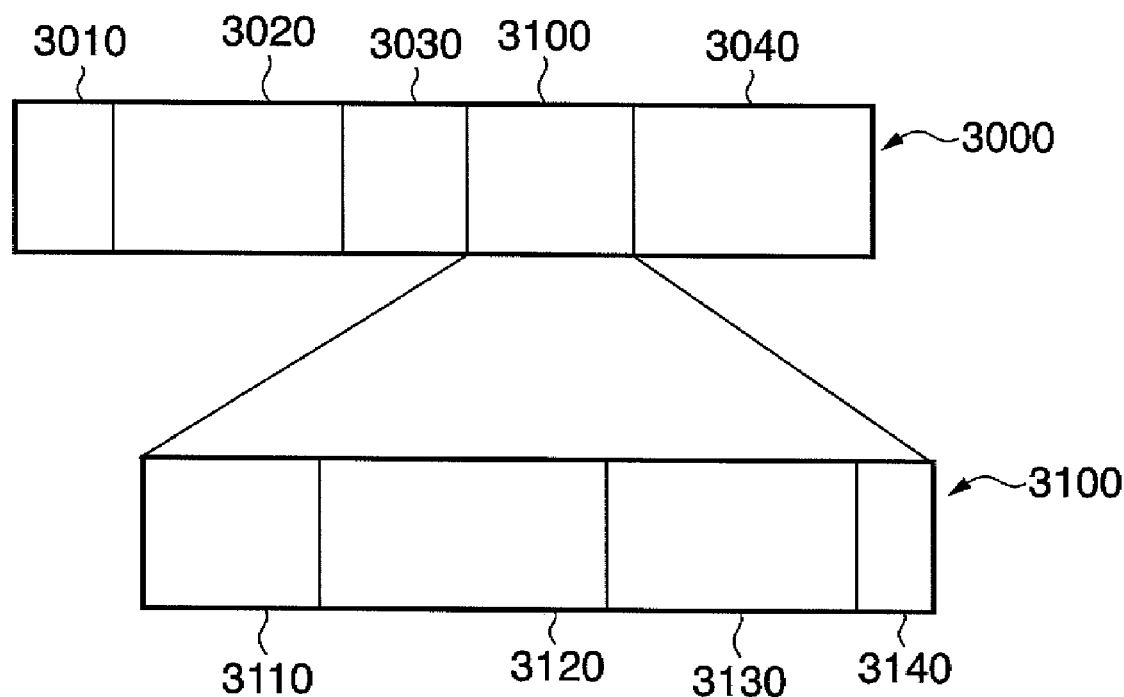
FIG. 3 is a diagram showing a memory map of the image forming apparatus 202.

FIG. 3 shows a memory map 3000 of the image forming apparatus 202. The memory space is divided beforehand into areas according to use: an OS area (3010), a firmware area (3020), an area (3030) for applications that need to run constantly, and an area (3100) for additional applications. In addition, memory areas (3040) such as so-called work and stack areas used for each software program to run. In FIG. 3, applications 1, 2, and 3 are installed in areas 3110, 3120, and 3130, respectively, in the additional application area 3100.

Area 3140 is an unused area. An additional application can be newly installed in the unused area 3140. The size of the unused area 3140 represents the upper limit of the size of installable programs. This resource limitation can prevent an additional application program from being installed. While the resource limitation has been stated in terms of memory size in this example, there may be other resource limitations, of course. For example, the number of applications that can be installed on the image forming apparatus may be limited, or the number or size of handles and ports used for linking applications with the image forming apparatus may be limited depending on specifications of an interface of an image forming apparatus.

<Procedure of Processing by the Management Server and Image Forming Apparatus>

Figure 4:
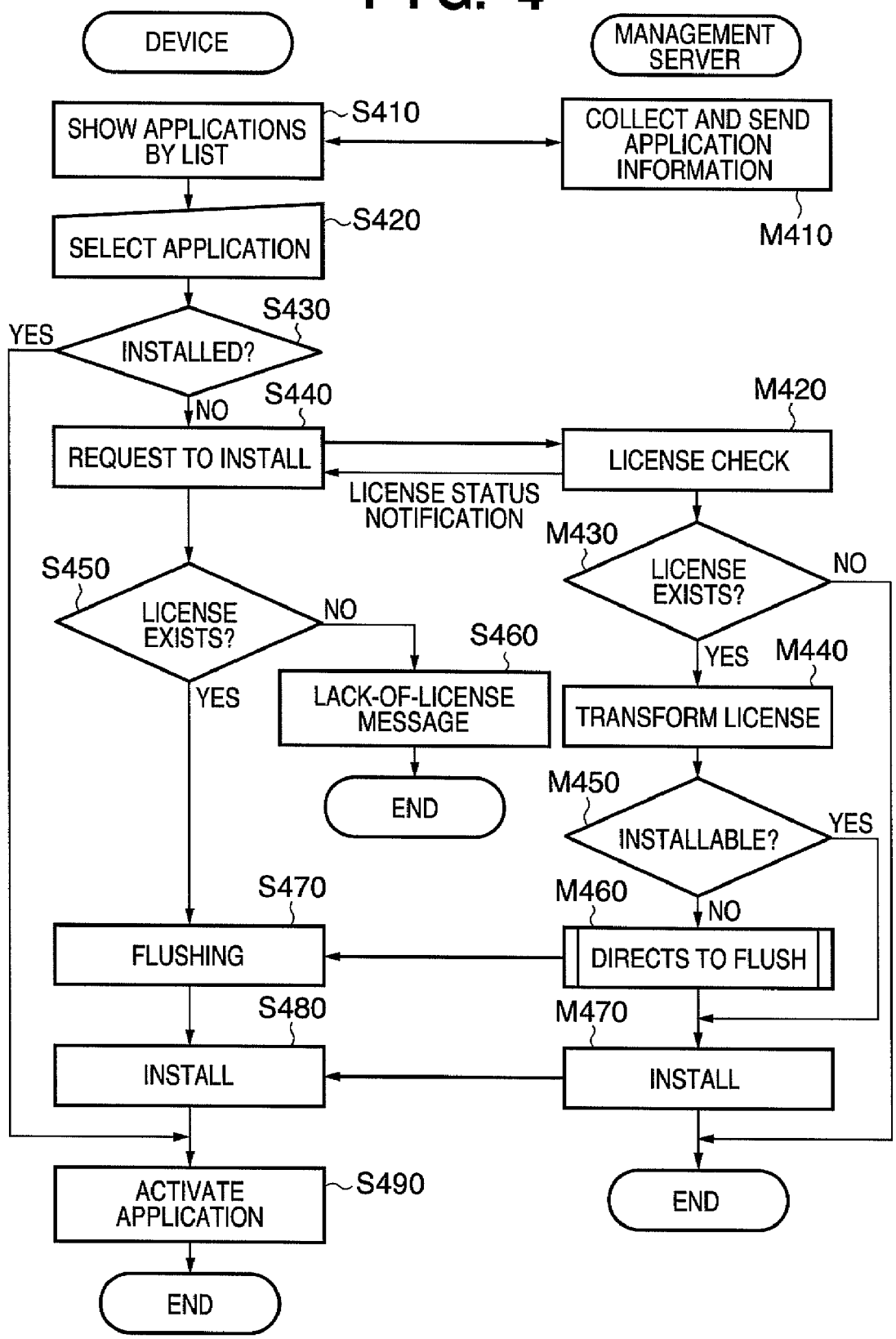
FIG. 4 is a flowchart illustrating a process according to the first embodiment.
Figure 6:
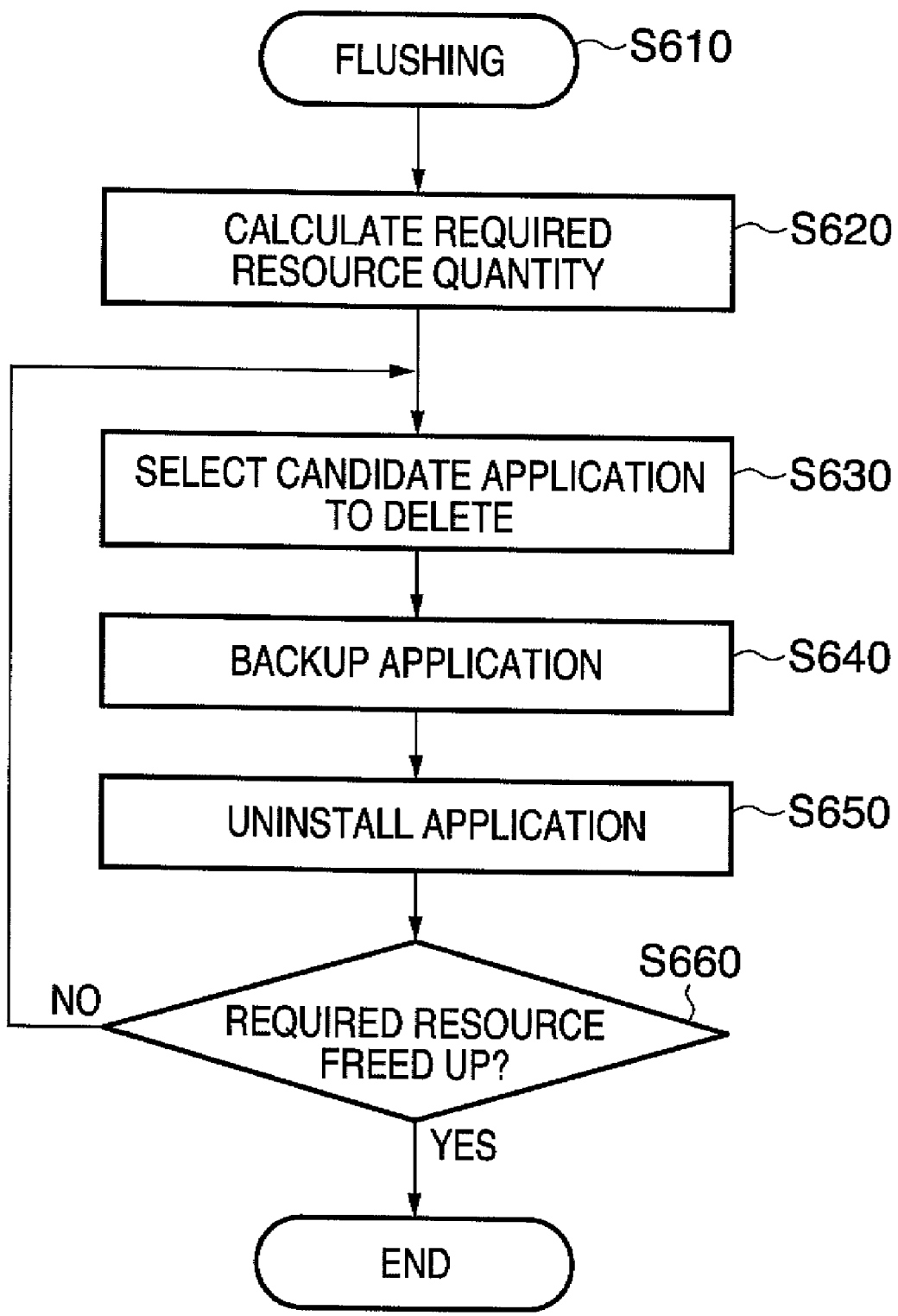
FIG. 6 is a flowchart of flushing.

A process flow will be described with reference to the flowchart of FIG. 4. The flowchart illustrates a process for a user to select and activate a desired application from among available applications. The left-hand part of the flowchart shows operation of a service 210 (i.e. the image forming apparatus 202) and the right-hand part shows a process performed by the management server 201.

In step S410 performed by the service 210 of the image forming apparatus 202 and step M410 performed by the management server 201, the service 210 and the management server 201 communicate with each other to send and receive information. Any of them may be the initiator. In step S410, the service 210 sends device information about the service 210, the statuses of installed applications, and the statuses of resources to the management server 201. The statuses of resources include the types of available resources and free space. In step M410, the management server 201 generates a list of information about additional applications that can run on the image forming apparatus 202 from the device information it received. This is done because some applications cannot run depending on the type of device operating and equipment information. The management server 201 sends the generated list information about applications that can run on the image forming apparatus 202 to the service 210. The service 210 displays the provided application list information on a panel of the UI.

FIG. 5 shows an exemplary list of information sent and received through communication between the image forming apparatus 202 and the management server 201. Device information 501 received by the management server 201 from the image forming apparatus 202 includes the model name 5011 of the image forming apparatus, the unique number 5012 of the apparatus, the version 5013 of the apparatus, the version 5014 of the application, and resource information. The version of the application may be version information of the platform of the additional application, for example. The resource information includes free memory space 5015, free hard disk space 5016, and an available capacity 5017, 5018 of other resources. The program information 502 generated, stored, and sent by the management server 201 to the image forming apparatus 202 includes the total number 5021 of applications installable on the image forming apparatus 202, and application information about the individual applications. The application information may include identification information, for example. The application information also includes the names 5022 of the applications, brief descriptions 5023 of the applications and the statuses 5024 of the applications. The brief description of an application may be a character string written beforehand. The status of an application indicates that the application is installable on the image forming apparatus 202, or a required license is not available, or the application has already been installed.

Figure 1:
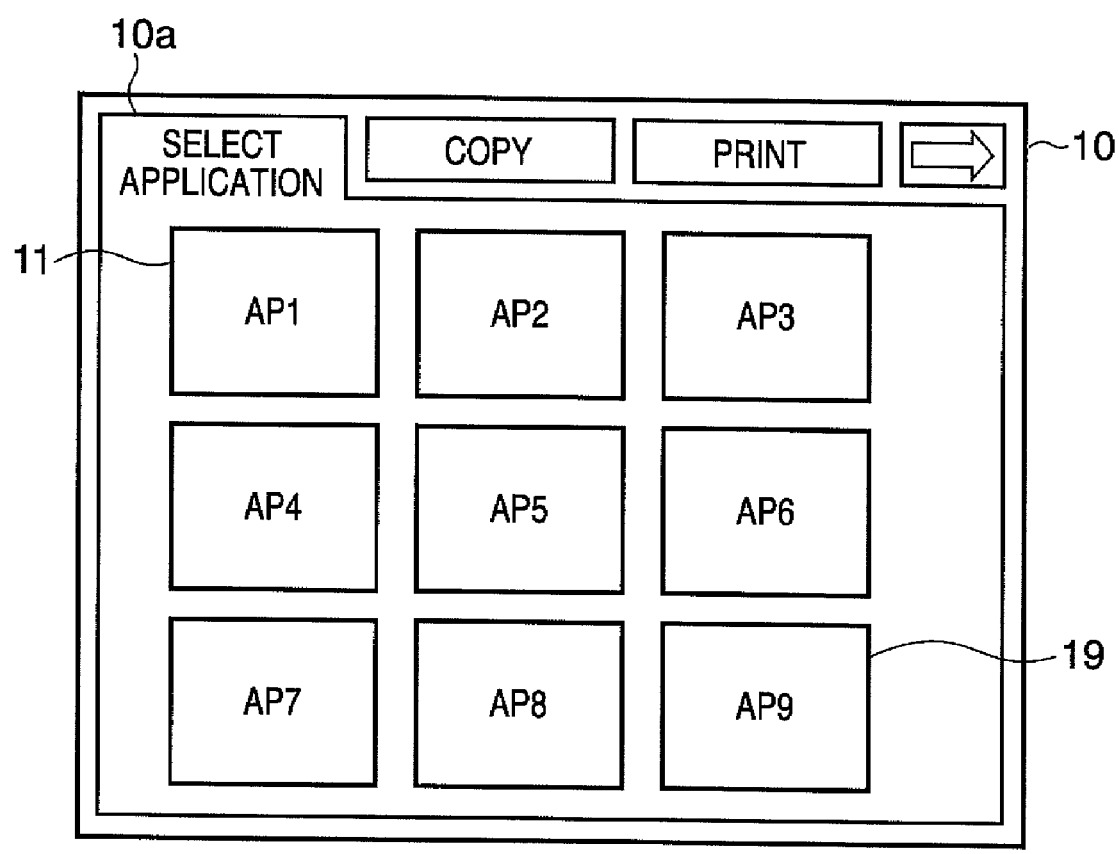
FIG. 1 is a diagram showing an exemplary display of a UI panel of an image forming apparatus 202 in the present invention.
Figure 2:
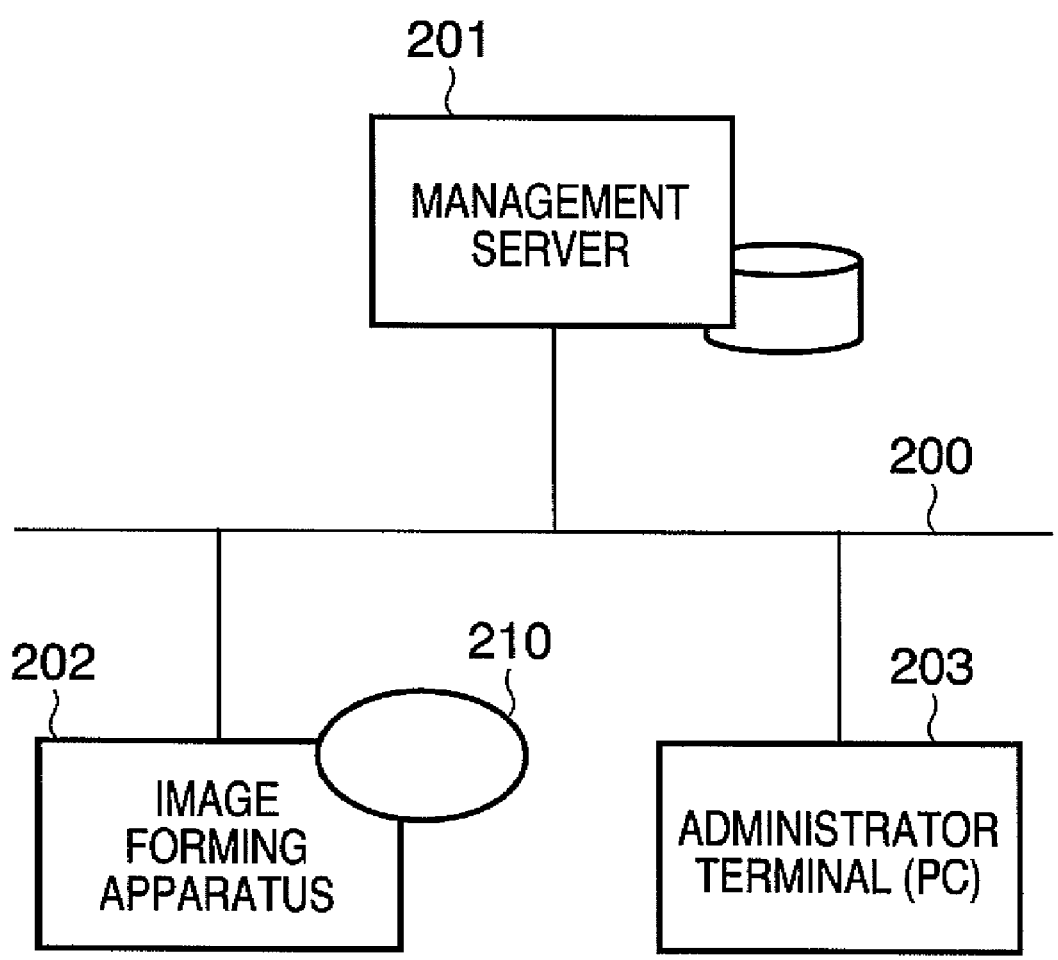
FIG. 2 is a diagram showing a system configuration for implementing a first embodiment.

FIG. 1 shows a UI console panel provided by the service 210 at step S410 on the image forming apparatus 202. The panel 10 is displayed when a user selects "Select application" 10a by using a panel switching button. The service 210 of the image forming apparatus 202 has obtained an application name from the application list information received from the management server 201 shown in FIG. 5. Application activation buttons AP1 (11)-AP9 (19) labeled with application names are displayed on a panel. Here, the buttons associated with applications that cannot be installed may be grayed out.

In step S420, a request for activation of any application selected by the user from among the applications displayed on the UI panel 10 of the image forming apparatus 202 is received. In step S430, the service 210 determines whether the additional application selected by the user at step S420 has been installed on the image forming apparatus 202. If so, the process proceeds to step S490, where the selected application is activated, and the application activation sequence will end. On the other hand, if the application selected by the user has not been installed, the service 210 requests the management server 201 to install the selected application in step S440.

The management server 201 receives the install request from the service 210 in step M420. The management server 201 determines whether the requested application requires a license. If a license is required, the management server 201 determines whether the management server 201 has a license (i.e. license information) to be assigned to the requesting image forming apparatus 202. If the management server 201 does not have the required license, the management server 201 returns "Lack-of-license" as a response to the install request by the service 210 of the image forming apparatus 202. If a license is not required or the management server 201 has a license to be assigned to the image forming apparatus 202, the management server 201 sends "License OK" to the service 210.

Upon reception of the notification "Lack-of-license", the service 210 displays the message "Lack-of-license" on the UI panel in step S460 and notifies the user that the application specified by the user cannot be activated, and then ends the process. If "License OK" notification is provided in response to the install request sent in step S440, the image forming apparatus 202 waits for the next processing from the management server 201.

On the other hand, if the management server 201 determines in step M430 that the management server 201 lacks the license, the management server 201 proceeds to step M480 and ends the process. On the other hand, if the management server 201 determines that the requested additional application can be used, that is, "license is sufficient", the management server 201 proceeds to step M440 and provides a license appropriate to the requesting image forming apparatus 202. Apparatus's unique information may be embedded in a license so that the application runs only on a specified apparatus in order to prevent unauthorized use and illegal copy. In step M440, the management server 201 incorporates information unique to the requesting image forming apparatus 202 from device information 501 collected in step M410 into the license. Alternatively, if licenses for individual apparatuses have been originally held in the management server 201, the management server 201 selects the license for the apparatus.

Figure 10:
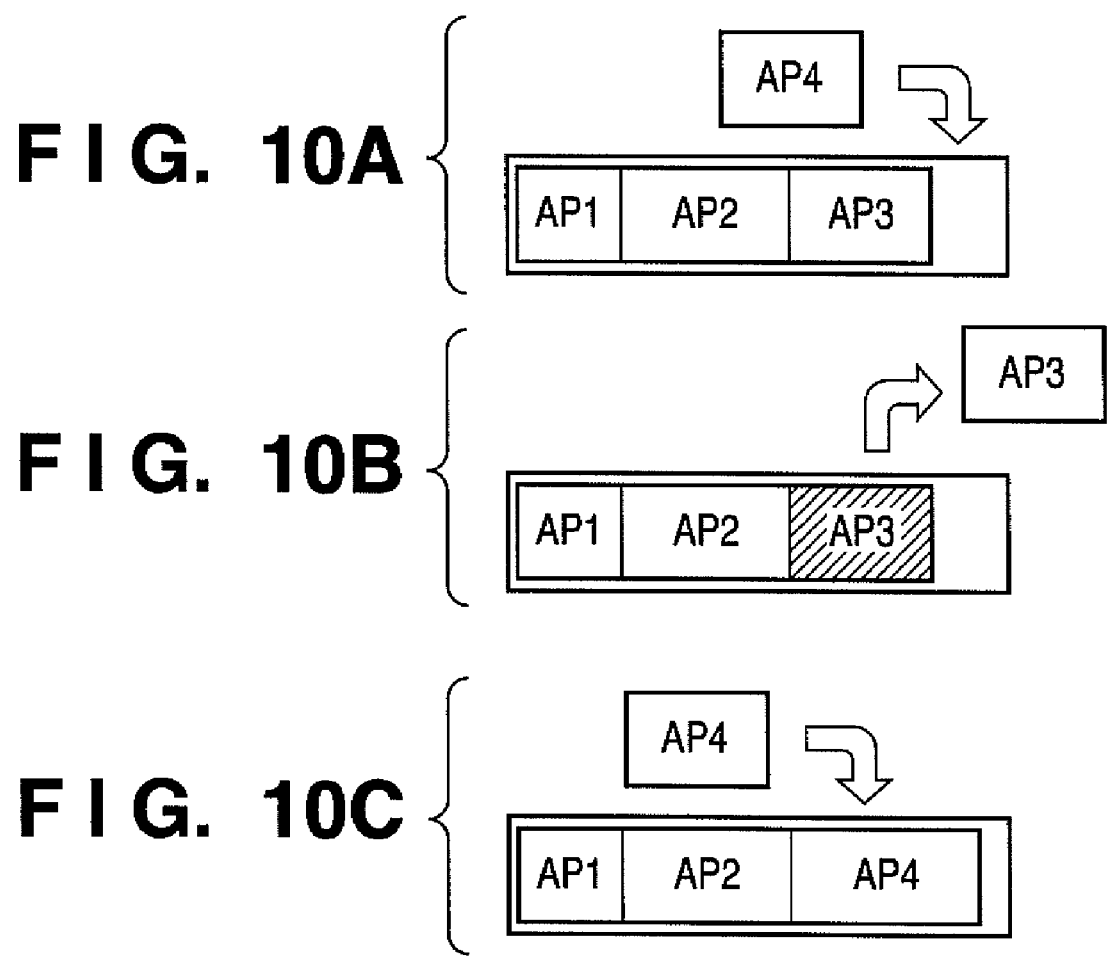
FIGS. 10A, 10B, and 10C are diagrams illustrating state transition of a memory due to flushing.

Then, the management server 201 determines in step M450 whether a resource available (unused resource 3140 in FIG. 3) on the requesting apparatus obtained in step M410 satisfies a resource requirement used by the specified application. If the management server 201 determines that the requesting apparatus does not satisfy the resource requirement for installing the application, the management server 201 directs the service 210 to perform flushing in step M460. This is the case where resources of the requesting image forming apparatus are being used by applications AP 1, AP2, and AP3 as shown in FIG. 10A. Installation of the new application AP4 is prevented because a resource required for AP4 is insufficient.

The service 210 performs flushing in step S470 in response to the flushing instruction (flushing request). Flushing is processing for freeing a resource required for the requested additional application by uninstalling an additional application already installed on a requesting image forming apparatus in a restorable manner. Details of the processing will be described later with reference to the flowchart of FIG. 6.

After completion of the flushing or if an available resource on the requesting apparatus satisfies the resource requirement used by the specified application in step M450, the process proceeds to step M470. In step M470, the specified application (i.e. program) is sent to the apparatus for installation, then the process on the management server 201 will end. That is, the program is sent in step M470.

On the other hand, the image forming apparatus 202 installs the application at step S480 in cooperation with the management server 201, and activates the installed application at step S490.

The flushing performed by the image forming apparatus 202 will be described with reference to the flowchart of FIG. 6 and FIGS. 10A, 10B, and 10C. First, the flushing instruction is activated in step S610. In step S620, the resource requirement for the additional application to be installed is derived. In step S630, an application to flush is selected from among the applications already installed on the image forming apparatus on which the application is to be installed. The criterion for the selection of an application may be that the application is an application that can free a sufficient resource for providing a resource required by the application to be installed, or an application with a low usage rate, or an application specified by the administrator as an application to be flushed. The usage rates of applications can be received as part of device information from the image forming apparatus. The usage rate may be the ratio of effective time of the additional application to the operating time of the image forming apparatus, for example. Determination as to whether resources are sufficient or not can be made by comparing the sum of unused resources indicated by resource information received from the image forming apparatus and resources that will be freed up by uninstallation of an application with the resource required by the additional application. The management server 201 holds information about the resource required by each additional application and therefore can obtain information about a resource freed by uninstallation from that information.

Backup of the application selected to be flushed in step 630 is performed in step S640. Backup is to save setting information specific to an application on the management server 201 so that the application can be restored to the original state when the application is reinstalled. In addition to the setting information, the state (context) of the additional program at the time point of uninstallation may be saved.

In step S650, the image forming apparatus is directed to uninstall the application to be flushed (the state shown in FIG. 10B). In response to this direction, the image forming apparatus uninstalls the application. As a result, the resource occupied by the application is freed (the state shown in FIG. 10C).

In step S660, determination is made as to whether the resources of the image forming apparatus 202 satisfy the resource requirement for the application to be installed by virtue of the resource freed up by the application uninstalled in step S650. If the requirement is still unsatisfied, the process returns to step S630. When the resource requirement for installing the specified application is satisfied, the flushing will end.

While it has been assumed that the user selects an application to be newly installed, the user may reinstall an application that has been uninstalled by flushing. In that case, the previous state before the flushing is restored by restoring (re-setting) the setting information specific to the application backed up in step S640 in FIG. 6 at the same time the application and license are installed in the install step M470.

With the configuration and procedure described above, the user can know the presence of an application (i.e. function) that has not been installed on the image forming apparatus. Furthermore, license management by the administrator is simplified. The continuity of work using an additional application (i.e. additive function) is maintained. Moreover, an insufficient-resource situation when installing an application can be resolved.

Second Embodiment

Figure 7:
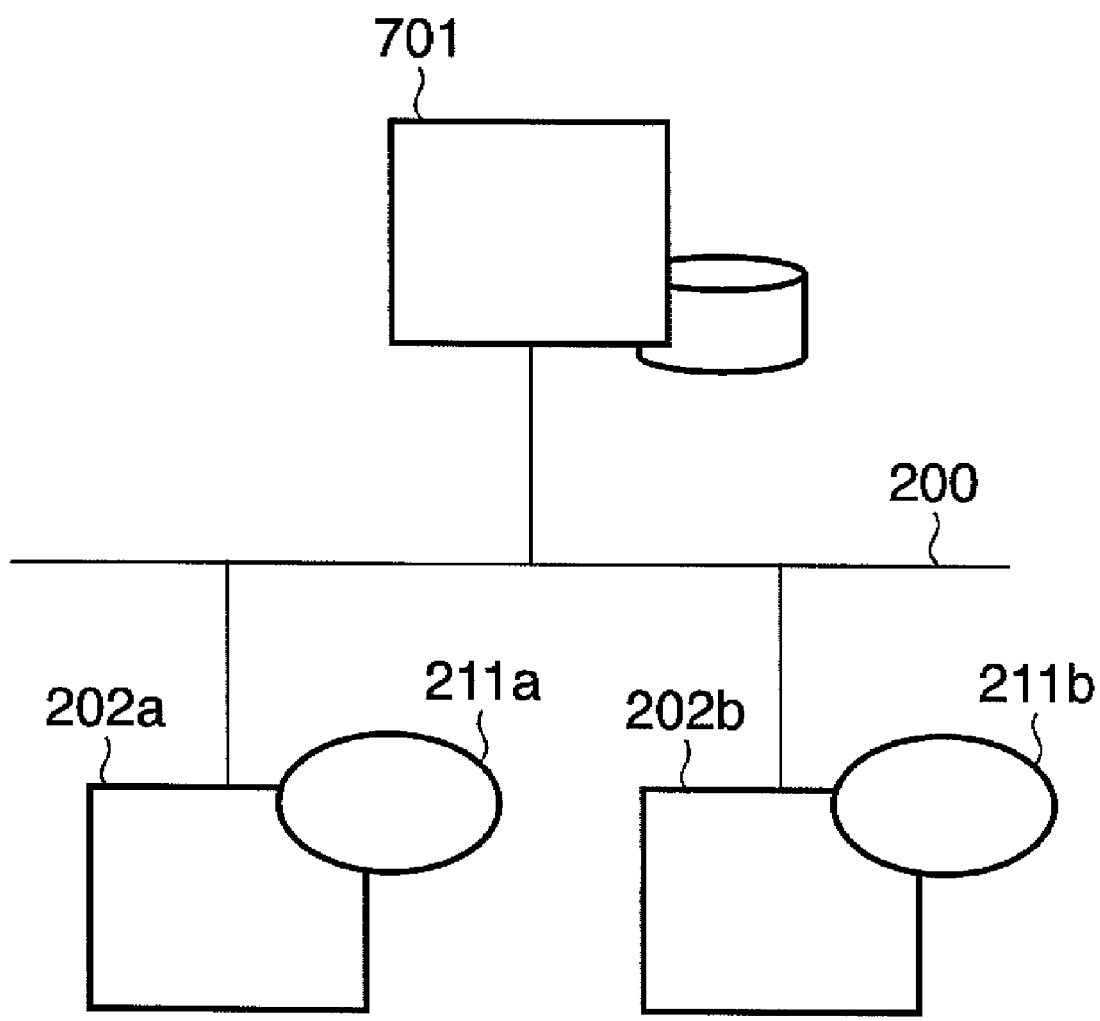
FIG. 7 is a diagram showing a system configuration for implementing a second embodiment.
Figure 8:
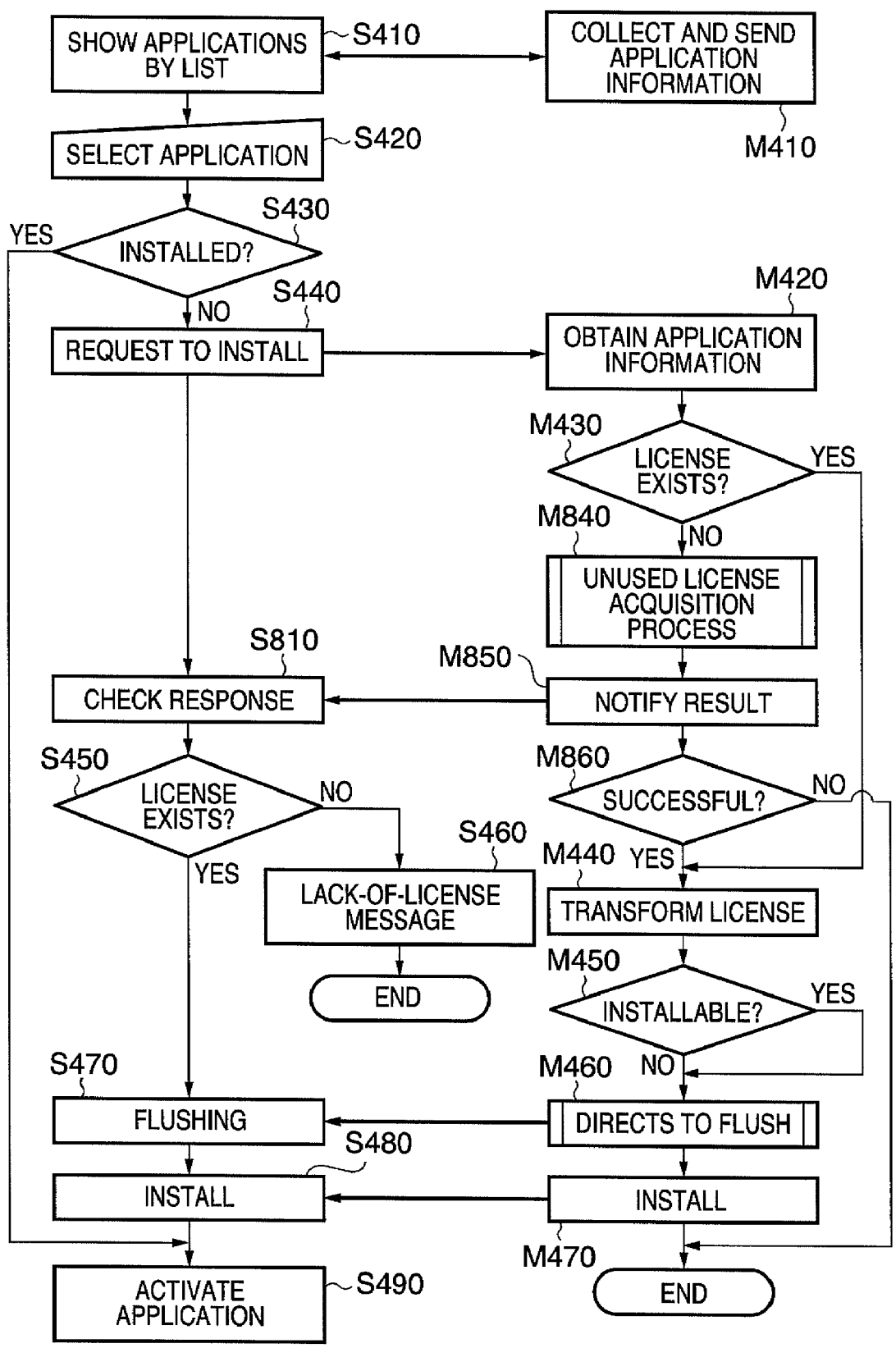
FIG. 8 is a flowchart illustrating a process according to the second embodiment.
Figure 9:
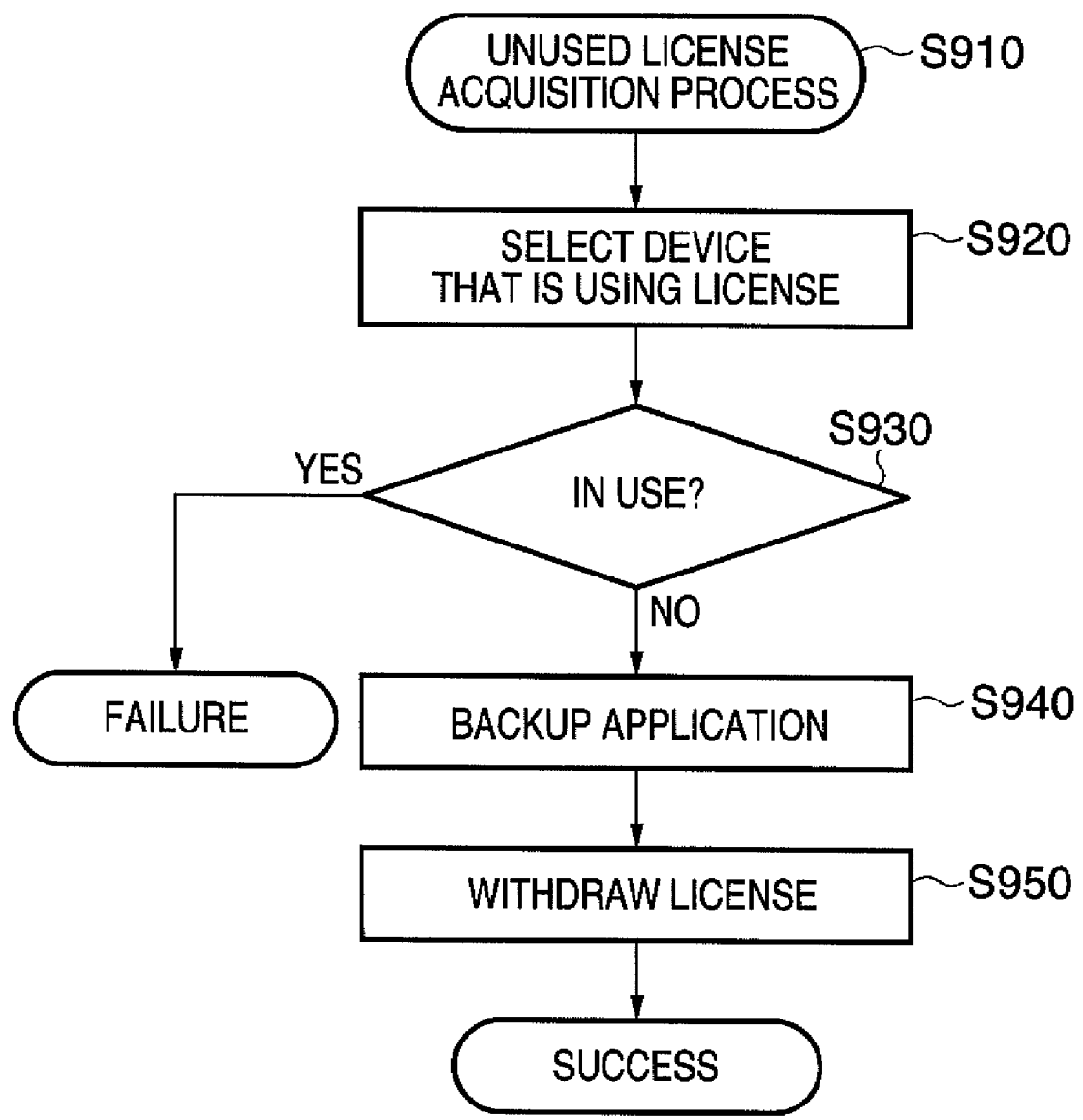
FIG. 9 is a flowchart of an unused license acquisition process.

A second embodiment of the present invention will be described with reference to FIGS. 7 to 9. FIG. 7 shows a configuration for implementing the second embodiment. In the second embodiment, when a request for an additional application from a first image forming apparatus cannot be met because the application is being used by a second image forming apparatus, a license is withdrawn from the second image forming apparatus and is reused.

In FIG. 7, first and second image forming apparatuses 202a and 202b and a management server 701 are interconnected through a network (LAN) 200.

Services 211a and 211b for communicating with the management server 701 are running on the first and second image forming apparatuses 202a and 202b, respectively. Each of the image forming apparatuses has the same configuration as that of the image forming apparatus 202 in the first embodiment. The management server has the same configuration as that of the server computer.

A flow of the process will be described with reference to the flowchart of FIG. 8. The flowchart illustrates a process for a user to select and activate a desired application from among available applications. The left-hand part of the flowchart shows operations of services of the image forming apparatuses 202a, 202b and the right-hand part shows a process performed on the management server 701. The steps that are the same as steps in FIG. 4 are labeled the same reference numerals.

In step S410 performed by the service 211a of the image forming apparatus 202a and step M410 performed by the management server 201, the service 211a and the management server 701 communicate with each other to send and receive information. Any of them may be the initiator. In step S410, the service 211a sends device information about the service 211a, the statuses of installed applications, and the statuses of resources to the management server 701. The statuses of resources include the types of available resources and free space. In step M410, the management server 701 generates a list of information about additional applications that can run on the image forming apparatus 202a from the device information it received. This is done because some applications cannot run depending on the type of device operating and equipment information. The management server 701 sends the generated list information about applications that can run on the image forming apparatus 202a to the service 211a. The service 211a displays the provided application list information on a panel of the UI.

FIG. 5 shows an exemplary list of information sent and received through communication between the image forming apparatus 202a and the management server 701. Device information 501 received by the management server 701 from the image forming apparatus 202a includes the model name 5011 of the image forming apparatus, the unique number 5012 of the apparatus, the version 5013 of the apparatus, the version 5014 of the application, and resource information. The version of the application may be version information of the platform of the additional application, for example. The resource information includes free memory space 5015, hard disk free space 5016, and an available capacity 5017, 5018 of other resources. The program information 502 generated, stored, and sent by the management server 701 to the image forming apparatus 202a includes the total number 5021 of applications installable on the image forming apparatus 202a, and application information about the individual applications. The application information includes the names 5022 of the applications, brief descriptions 5023 of the applications and the statuses 5024 of the applications. The brief description of an application may be a character string written beforehand. The status of an application indicates that the application is installable on the image forming apparatus 202a or a required license is not available, or the application has already been installed.

FIG. 1 shows a UI console panel provided by the service 211a in step S410 on the image forming apparatus 202a. The panel 10 is displayed when a user selects "Select application" 10a by using a panel switching button. The service 211a of the image forming apparatus 202a has obtained an application name from the application list information received from the management server 701 shown in FIG. 5. Application activation buttons AP1 (11)-AP9 (19) labeled with application names are displayed on a panel. Here, the buttons associated with applications that cannot be installed may be grayed out.

In step S420, a request for activation of any application selected by the user from among the applications displayed on the UI panel 10 of the image forming apparatus 202a is received. In step S430, the service 211a determines whether the additional application selected by the user in step S420 has been installed on the image forming apparatus 202a. If so, the process proceeds to step S490, where the selected application is activated, and the application activation sequence will end. On the other hand, if the application selected by the user has not been installed, the service 211a requests the management server 701 to install the selected application in step S440.

The management server 701 receives the install request from the service 211a in step M420. The management server 701 determines whether the requested application requires a license. If a license is required, the management server 701 determines whether the management server 701 has a license (i.e. license information) to be assigned to the requesting image forming apparatus 202a. If the management server 701 does not have the required license, the management server 701 returns "Lack-of-license" as a response to the install request by the service 211a of the image forming apparatus 202a. If a license is not required or the management server 701 has a license to be assigned to the image forming apparatus 202a, the management server 701 sends "License OK" to the service 211a.

Upon reception of the notification "Lack-of-license", the service 211a displays the message "Lack-of-license" on the UI panel in step S460 and notifies the user that the application specified by the user cannot be activated, then ends the process. If "License OK" notification is provided in response to the install request sent in step S440, the image forming apparatus 202a waits for the next processing from the management server 701.

On the other hand, if the management server 701 determines in step M430 that the management server 701 lacks a license, the management server 701 proceeds to step M480. If a required license is not available, the management server 701 executes an "unused license acquisition process" in step M840. The "unused license acquisition process" is a process for forcibly withdrawing a license installed on a second image forming apparatus 202b other than the requesting, first image forming apparatus 202a. The process will be detailed later with reference to the flowchart of FIG. 9.

In step M850, the management server 701 sends the result as to whether the license has been successfully acquired (withdrawn) in step M840 (whether "License OK" or "Lack of license") as a response to the install request from the service 211a. The service 211a of the image forming apparatus 202a checks the notification of result of the license acquisition in step S810. If the response is "Lack-of-license", the service 211a displays a message indicating "Lack-of-license" on the UI panel of the image forming apparatus 202a in step S460 to indicate to the user that the activation of the application has failed. If the service 211a determines that the response is "License sufficient", the service 211a waits for an instruction from the management server 701.

The management server 701 determines in step M805 whether the "unused license acquisition process" has been successfully complete. If the process has failed, the application activation sequence will end.

On the other hand, if the "unused license acquisition process" has been successfully completed, license transformation is performed in step M440. The process also proceeds to step M440 if it is determined at step M430 that the requested additional application is allowed to be used, that is, the response is "License sufficient". In step M440, the management server 701 provides a license appropriate to the requesting image forming apparatus 202a. Apparatus's unique information may be embedded in a license so that the application runs only on a specified apparatus in order to prevent unauthorized use and illegal copy. In step M440, the management sever 701 incorporates information unique to the requesting image forming apparatus 202a from device information 501 collected in step M410 into the license. Alternatively, if licenses for individual apparatuses have been originally held in the management server 701, the management server 701 selects the license for the apparatus.

Then, the management server 701 determines in step M450 whether a resource (unused resource 3140 in FIG. 3) available on the requesting apparatus obtained in step M410 satisfies the resource requirement used by the specified application. If the management server 701 determines that the requesting apparatus does not satisfy the resource requirement for installing the application, the management server 701 directs the service 211a to perform flushing in step M460. This is the case where resources of the requesting image forming apparatus are being used by applications AP 1, AP2, and AP3 as shown in FIG. 10A. Installation of the new application AP4 is prevented because resources required for AP4 is not available.

The service 211a performs flushing in step S470 in response to the flushing instruction (flushing request). Flushing is processing for freeing a resource required for the requested additional application by uninstalling an additional application already installed on the requesting image forming apparatus in a restorable manner. Details of the processing in step M460 is the same as the processing that has been described with reference to the flowchart of FIG. 6.

After completion of the flushing or if an available resource on the requesting apparatus satisfies the resource requirement used by the specified application in step M450, the process proceeds to step M470. In step M470, the specified application is installed and then the process on the management server 701 will end.

On the other hand, the image forming apparatus 202a installs the application in step S480 in cooperation with the management server 701, and activates the installed application in step S490.

The "unused license acquisition process" in step S840 will be described below with reference to the flowchart of FIG. 9. First, the management server 701 activates the unused license acquisition process in step S910. In step S920, the management server 701 searches for a second image forming apparatus 202b other than the requesting, first image forming apparatus 202a that is using a license required by the requesting apparatus. In step M420 of FIG. 8, the management server 701 has communicated with the service 211a of the image forming apparatus 202a and the service 211b of the image forming apparatus 202b to obtain device information. Consequently, the management server 701 has status information about licenses and applications delivered to all image forming apparatuses. If there are multiple second image forming apparatuses, the management server 701 selects the second image forming apparatus whose usage rate is the lowest, for example. Alternatively, the management server 701 may select an unused image forming apparatus. There may be various selection criteria. The management server 701 selects an appropriate second image forming apparatus 202b based on any of selection criteria.

In step S930, the management server 701 determines whether the selected second image forming apparatus 202b is using the license to be withdrawn. If the second image forming apparatus 202b is using the license to be withdrawn, the management server 701 searches for another image forming apparatus and determines whether the image forming apparatus is using the license. If none of the image forming apparatuses other than the first image forming apparatus has the license or the additional application associated with the license is being used, the "unused license acquisition process" fails. Consequently, the management server 701 returns information indicating the failure of the "unused license acquisition process" to the requesting apparatus and will end the process.

If a second image forming apparatus 202b has a license installed on it and the application of interest is not being executed, the process proceeds to step S940. In step S940, the management server 701 makes and saves a backup copy of setting information of the application associated with the license to be withdrawn on the management server 701 to restore the application. Then, the management server 701 withdraws the license in step S950, notifies to the requesting apparatus that the "unused license acquisition process" has been successfully performed, and then ends the process. License withdrawal is a process in which license information and the additional application are uninstalled and information indicating that one unused license has become available is added to license management information on the management server.

With the configuration and procedure described above, in addition to the effect of the first embodiment, a license for an additional application can be interchanged more flexibly and a limited number of licenses can be effectively used.

The present invention may be applied to a system made up of multiple devices (for example a host computer, an interface device, a reader, and a printer) or to an apparatus formed by a single device (for example a copying machine or a facsimile machine). The object of the present invention can also be achieved by providing a recording medium on which a program code that implements the functions of any of the embodiments described above is stored to a system or an apparatus to cause the computer of the system or apparatus to read and execute the program code stored on the recording medium. In that case, the program code itself read from the recording medium implements the functions of any of the embodiment described above and the program code itself and the recording medium on which the program code is stored constitute the present invention.

The present invention also includes an implementation in which an operating system (OS) running on a computer performs part or all of actual processing in accordance with instructions in the program code and the processing implements the functions of any of the embodiments described above. The present invention is also applicable to an implementation in which the program code read from a recording medium is written on a memory provided in a function expansion card inserted into a computer or a function expansion unit connected to a computer. In that case, a CPU and other components provided in the function expansion card or the function expansion unit perform part or all of actual processing in accordance with instructions in the program code written and the processing implements the functions of any of the embodiments described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent No. 2007-80189, filed Mar. 26, 2007 which is hereby incorporated by reference herein in its entirety.

What is claimed is:

1. A program management apparatus connected at least to an image forming apparatus and managing a particular program installable to the image forming apparatus, comprising:
   a storage, configured to store program information including identification information of the particular program installable to the image forming apparatus;
   a program information transmitter, configured to transmit the program information stored in said storage to the image forming apparatus;
   a program transmitter, configured to transmit the particular program to the image forming apparatus for installing the particular program on the image forming apparatus in response to a request for program execution from the image forming apparatus;
   a receiver, configured to receive resource information indicating an available resource from the image forming apparatus, and to receive an installation request for installing a selected program selected by a user via list information of additional applications that can run on the image forming apparatus, wherein the particular program is the selected program;
   a determination unit configured to determine whether or not the image forming apparatus has a resource for installing the particular program; and
   a flushing requesting unit, configured to transmit an uninstall request to the image forming apparatus to uninstall a previously installed program previously installed on the image forming apparatus if it is determined on the basis of the resource information that the image forming apparatus lacks a resource for the particular program, wherein the flushing requesting unit is configured to instruct the image forming apparatus to install the particular program without issuing an instruction for uninstalling the previously installed program if said determination unit determines that the image forming apparatus has a resource for installing the particular program upon installing the particular program to the image forming apparatus, wherein said program transmitter is configured to transmit the particular program to be installed to the image forming apparatus after the previously installed program is uninstalled in response to the uninstall request from said flushing requesting unit, and wherein the resource for the program is available memory storage, an available number of programs that can be installed on the image forming apparatus, or an available number or size of handles and ports used for linking programs with the image forming apparatus.

2. The program management apparatus according to claim 1, further comprising a setting information saver, configured to save setting information of the previously installed program set at a time point of uninstallation when the previously installed program is uninstalled from the image forming apparatus in response to the uninstall request from said flushing requesting unit;

wherein, when the uninstalled program is to be reinstalled to the image forming apparatus, setting information saved by said setting information saver is transmitted to the image forming apparatus to cause the image forming apparatus to re-set the setting information in order to restore the setting information set at the time point of uninstallation of the program.

3. An image forming system with an additive function including a program management apparatus and an image forming apparatus, the program management apparatus managing a program installable to the image forming apparatus, and the image forming apparatus connected with the program management apparatus, wherein said program management apparatus comprises:
a storage, configured to store program information including identification information of a particular program installable to the image forming apparatus;
a program information transmitter, configured to transmit the program information stored in said storage to the image forming apparatus;
a program transmitter, configured to transmit the particular program to the image forming apparatus for installing the particular program on the image forming apparatus in response to a request for program execution from the image forming apparatus;
a receiver, configured to receive resource information indicating an available resource from the image forming apparatus, and to receive an installation request for installing a selected program selected by a user via list information of additional applications that can run on the image forming apparatus, wherein the particular program is the selected program;
a determination unit configured to determine whether or not the image forming apparatus has a resource for installing the particular program; and
a flushing requesting unit, configured to transmit an uninstall request to the image forming apparatus to uninstall a previously installed program previously installed on the image forming apparatus if it is determined on the basis of the resource information that the image forming apparatus lacks a resource for the particular program, wherein the flushing requesting unit is configured to instruct the image forming apparatus to install the particular program without issuing an instruction for uninstallinq the previously installed program if said determination unit determines that the image forming apparatus has a resource for installing the particular program upon installing the particular program to the image forming apparatus, wherein said program transmitter is configured to transmit the particular program to be installed to the image forming apparatus after the previously installed program is uninstalled in response to the uninstall request from said flushing requesting unit, wherein the resource for the program is available memory storage, an available number of programs that can be installed on the image forming apparatus, or an available number or size of handles and ports used for linking programs with the image forming apparatus, and wherein said image forming apparatus comprises:
a list displaying unit, configured to display a list of available programs in accordance with identification information of programs included in program information received from said program management apparatus;
an installer, configured to transmit a request for the particular program to said program management apparatus, the particular program selected from said list of available programs on said list displaying unit and, when a request for installation of the particular program has been received from said program management apparatus in response to the request for the particular program, the installer is configured to install the particular program; and
an uninstaller, configured to uninstall a program requested to be uninstalled when a request for uninstallation of the program has been received prior to the request for installation.

4. A program management method performed by a program management apparatus connected at least to an image forming apparatus and managing a particular program installable to the image forming apparatus, comprising the steps of:
storing program information including identification information of the particular program installable to the image forming apparatus;
transmitting the program information stored in said storing means to the image forming apparatus;
transmitting the particular program to the image forming apparatus for installing the particular program on the image forming apparatus in response to a request for program execution from the image forming apparatus;
receiving resource information indicating an available resource from the image forming apparatus;
receiving an installation request for installing a selected program selected by a user via list information of additional applications that can run on the image forming apparatus, wherein the particular program is the selected program;
determining whether or not the image forming apparatus has a resource for installing the particular program;
transmitting an uninstall request to the image forming apparatus to uninstall a previously installed program previously installed on the image forming apparatus if it is determined on the basis of the resource information that the image forming apparatus lacks a resource for the particular program; and instructing the image forming apparatus to install the particular program without issuing an instruction for uninstalling the previously installed program if it is determined in said step of determining that the image forming apparatus has a resource for installing the particular program upon installing the particular program to the image forming apparatus, wherein the step of transmitting the program transmits the particular program to be installed to the image forming apparatus after the previously installed program is uninstalled in response to the uninstall request from said step of transmitting the uninstall request, and wherein the resource for the program is available memory storage, an available number of programs that can be installed on the image forming apparatus, or an available number or size of handles and ports used for linking programs with the image forming apparatus.

5. A non-transitory computer-readable storage medium storing a program that, when executed by a computer in a program management apparatus connected at least to an image forming apparatus and managing a particular program installable to the image forming apparatus, causes the program management apparatus to perform a program management method comprising the steps of:

storing program information including identification information of the particular program installable to the image forming apparatus;

transmitting the program information stored in said storing means to the image forming apparatus;

transmitting the particular program to the image forming apparatus for installing the particular program on the image forming apparatus in response to a request for program execution from the image forming apparatus;

receiving resource information indicating an available resource from the image forming apparatus;

receiving an installation request for installing a selected program selected by a user via list information of additional applications that can run on the image forming apparatus, wherein the particular program is the selected program;

determining whether or not the image forming apparatus has a resource for installing the particular program;

transmitting an uninstall request to the image forming apparatus to uninstall a previously installed program previously installed on the image forming apparatus if it is determined on the basis of the resource information that the image forming apparatus lacks a resource for the particular program; and instructing the image forming apparatus to install the particular program without issuing an instruction for uninstalling the previously installed program if it is determined in said step of determining that the image forming apparatus has a resource for installing the particular program upon installing the particular program to the image forming apparatus, wherein the step of transmitting the program transmits the particular program to be installed to the image forming apparatus after the previously installed program is uninstalled in response to the uninstall request from said step of transmitting the uninstall request, and wherein the resource for the program is available memory storage, an available number of programs that can be installed on the image forming apparatus, or an available number or size of handles and ports used for linking programs with the image forming apparatus.

\* \* \* \* \*